United States Patent [19]
Nelson et al.

[11] Patent Number: 5,982,375
[45] Date of Patent: *Nov. 9, 1999

[54] FLOATING POINT PROCESSOR FOR A THREE-DIMENSIONAL GRAPHICS ACCELERATOR WHICH INCLUDES SINGLE-PASS STEREO CAPABILITY

[75] Inventors: Scott R. Nelson, Pleasanton; Wayne Morse, Fremont; Kevin Rushforth, San Jose, all of Calif.

[73] Assignee: Sun Microsystems, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/879,621

[22] Filed: Jun. 20, 1997

[51] Int. Cl.$^6$ ..................................................... G06T 17/00
[52] U.S. Cl. ............................................................ 345/419
[58] Field of Search ..................................... 345/418, 419, 345/420

[56] References Cited

U.S. PATENT DOCUMENTS

| | | | |
|---|---|---|---|
| 5,049,987 | 9/1991 | Hoppenstein | 358/88 |
| 5,090,038 | 2/1992 | Asahina | 378/41 |
| 5,325,472 | 6/1994 | Horiuchi et al. | 345/427 |
| 5,566,280 | 10/1996 | Fukui et al. | 345/419 |
| 5,613,048 | 3/1997 | Chen et al. | 345/419 |

OTHER PUBLICATIONS

Second Edition in C—Computer Graphics: Principles and Practice, Addison–Wesley Publishing Company, 1996, pp. 616–617.

Primary Examiner—Phu K. Nguyen
Assistant Examiner—Cliff N. Vo
Attorney, Agent, or Firm—Conley, Rose & Tayon; Jeffrey C. Hood; Dean M. Monyon

[57] ABSTRACT

A computer system which exhibits increased performance for stereo viewing. The computer system includes a display screen, a bus for transferring data, a memory coupled to the bus for storing geometric primitives and left and right view transformation matrices. Furthermore, the computer system includes a processor coupled to the bus, wherein the processor is configured to enable stereo mode and to execute an application for rendering objects on the display screen in the stereo mode. The computer system also includes a graphics accelerator coupled to the bus. The graphics accelerator includes a buffer for storing a received geometric primitive to be rendered in stereo mode, as well as memory for storing the left and right view transformation matrices. The graphics accelerator also includes a transformation unit which is configured to generate a first transformed geometric primitive in response to the received geometric primitive and the left view transformation matrices. The transformation unit is configured to subsequently generate a second transformed geometric primitive in response to the received geometric primitive and the right view transformation matrices. The received geometric primitive is maintained in the buffer subsequent to generation of the first transformed geometric primitive at least until accessed by said transformation unit during generation of second transformed geometric primitive.

30 Claims, 7 Drawing Sheets

FIG. 7 though the refresh rate is doubled. For example, if the refresh rate
FLOATING POINT PROCESSOR FOR A THREE-DIMENSIONAL GRAPHICS ACCELERATOR WHICH INCLUDES SINGLE-PASS STEREO CAPABILITY

FIELD OF THE INVENTION

The present invention relates to a 3-D graphics accelerator, and more particularly to an improved floating point processor architecture for a 3-D graphics accelerator which includes improved performance for rendering objects to be viewed in stereo mode.

DESCRIPTION OF THE RELATED ART

A three dimensional (3-D) graphics accelerator is a specialized graphics rendering subsystem for a computer system which is designed to off-load the 3-D rendering functions from the host processor, thus providing improved system performance. In a system with a 3-D graphics accelerator, an application program executing on the host processor of the computer system generates three-dimensional geometry data that defines three-dimensional graphics elements for display on a video output device. The application program causes the host processor to transfer the geometry data to the graphics accelerator. The graphics accelerator receives the geometry data and renders the corresponding graphics elements on the display device.

One of the goals of many computer graphics systems is to be able to render objects that are realistic to the user. The problem of visual realism, however, is quite complex. Objects in the "real world" include an incredible amount of detail, including subtle variations in color, reflections, and surface properties.

One difficulty in creating visual realism through computer graphics is that most display devices are 2-D. Thus, when real-world, 3-D objects are projected into the 2-D space of the display device, there is typically a corresponding loss in realism. Many computer graphics techniques attempt to restore depth information to a rendered image, thereby aiding the human visual system to correctly interpret the spatial relationships of the image. These techniques, which provide "depth cues" to the human eye, may involve such processes as varying the intensity of pixels in relation to depth, visible surface determination, perspective projections, etc.

Each of the above techniques provides the same image to each eye of the viewer. In the human visual system, however, each eye views a given object from a slightly different perspective. (This effect can be observed by looking at a nearby object with one eye, then the other). The views are different because our eyes are separated from one another by a short distance. This effect, known as binocular disparity, provides a depth cue to the eye called stereo vision. The brain assembles these two images (called a "stereo pair") into one which is interpreted as being in 3-D.

In order to enhance realism, some computer graphics systems support viewing in a stereo mode. In such systems, stereo pairs are presented on one or more display devices. In some systems, the display is observed through a stereo viewer which channels each of the images to a fixed point in front of the screen where the viewer is positioned. Another technique is time-multiplexing left and right eye images in rapid order. This requires blocking the view of one eye while the other eye's image is being presented. In older systems, this may be accomplished through a device such as a mechanical shutter which, when synchronized to the frame buffer, blocks the view of one eye at a time. Alternatively, an electronic shutter which repeatedly polarizes light in one direction and then another may be placed in front of the display screen. Special glasses, in which each lens polarizes light differently, may then be used to achieve the stereo viewing effect.

More recently developed systems employ polarized stereo glasses which are synchronized to the display refresh rate. The hardware utilizes half of the frame buffer memory for the left eye view, and the other half for the right eye view. The resolution of the display is thus reduced in half, while the refresh rate is doubled. For example, if the refresh rate is 120 Hz, the effective refresh rate for each eye is 60 Hz in stereo mode. A signal is sent from the display to the stereo glasses which indicates when the left eye view is valid and when the right eye view is valid. At any given time, the glasses are dark for one eye and transparent for the other, insuring that each eye sees the correct half of the stereo pair. Inexpensive stereo glasses have a small cable over which the synchronization signal is sent, while more expensive glasses use an infrared transmitter.

In prior art stereo viewing systems, an application program originally encoded to generate geometry data for a non-stereo image typically has to be re-encoded to render stereo images. This is a non-trivial task which involves submitting the same geometry data more than once. In the case of left/right stereo, the geometry data is submitted by the host to the graphics accelerator an additional time, while in multi-channel stereo (3 stereo pairs, 5 stereo pairs, etc.), additional submissions of the geometry data are required. In some applications, the process of producing geometry data is not deterministic, which makes the repeated submission of geometry data problematic. This may produce unwanted side effects and cause the geometry to be represented differently for additional images. Furthermore, the repeated submission of geometry data causes increased bus traffic from the host CPU to the graphics accelerator, thereby limiting system performance. The increased vertex processing requirements of the additional geometric primitives further adversely affects system performance.

A graphics accelerator is therefore desired which provides increased performance for stereo viewing.

SUMMARY OF THE INVENTION

The present inventions comprises a graphics accelerator with single-pass stereo capability. In one embodiment, a computer system is provided which exhibits increased performance for stereo viewing. The computer system includes a display screen, a bus for transferring data, and a memory coupled to the bus for storing geometric primitives and left and right view transformation matrices. Furthermore, the computer system includes a processor coupled to the bus, wherein the processor is configured to enable stereo mode and to execute an application for rendering objects on the display screen in stereo mode. The computer system also includes a graphics accelerator coupled to the bus. The graphics accelerator includes a buffer for storing a received geometric primitive to be rendered in stereo mode, as well as memory for storing the left and right view transformation matrices. The graphics accelerator also includes a transformation unit which is configured to generate a first transformed geometric primitive in response to the received geometric primitive and the left view transformation matrices. The transformation unit is configured to subsequently generate a second transformed geometric primitive in response to the received geometric primitive and the right view transformation matrices. The received geometric primitive is maintained in the buffer subsequent to generation of the first transformed geometric primitive at least until accessed by the transformation unit during generation of the second transformed geometric primitive.

By maintaining the received geometric primitive in the input buffer, the graphics accelerator may perform rendering of stereo pairs without receiving the primitive data a second time from the host CPU, thereby reducing traffic on the host bus. A more efficient microcode implementation may also be achieved within the transformation unit of the graphics accelerator. Additionally, a more accurate graphical representation of the stereo pair corresponding to the received geometric primitive may be rendered, in contrast to prior art designs in which inaccuracies may result when non-deterministic geometry data is re-calculated by the host CPU for additional submissions to the graphics accelerator.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE EMBODIMENTS

Figure 1:
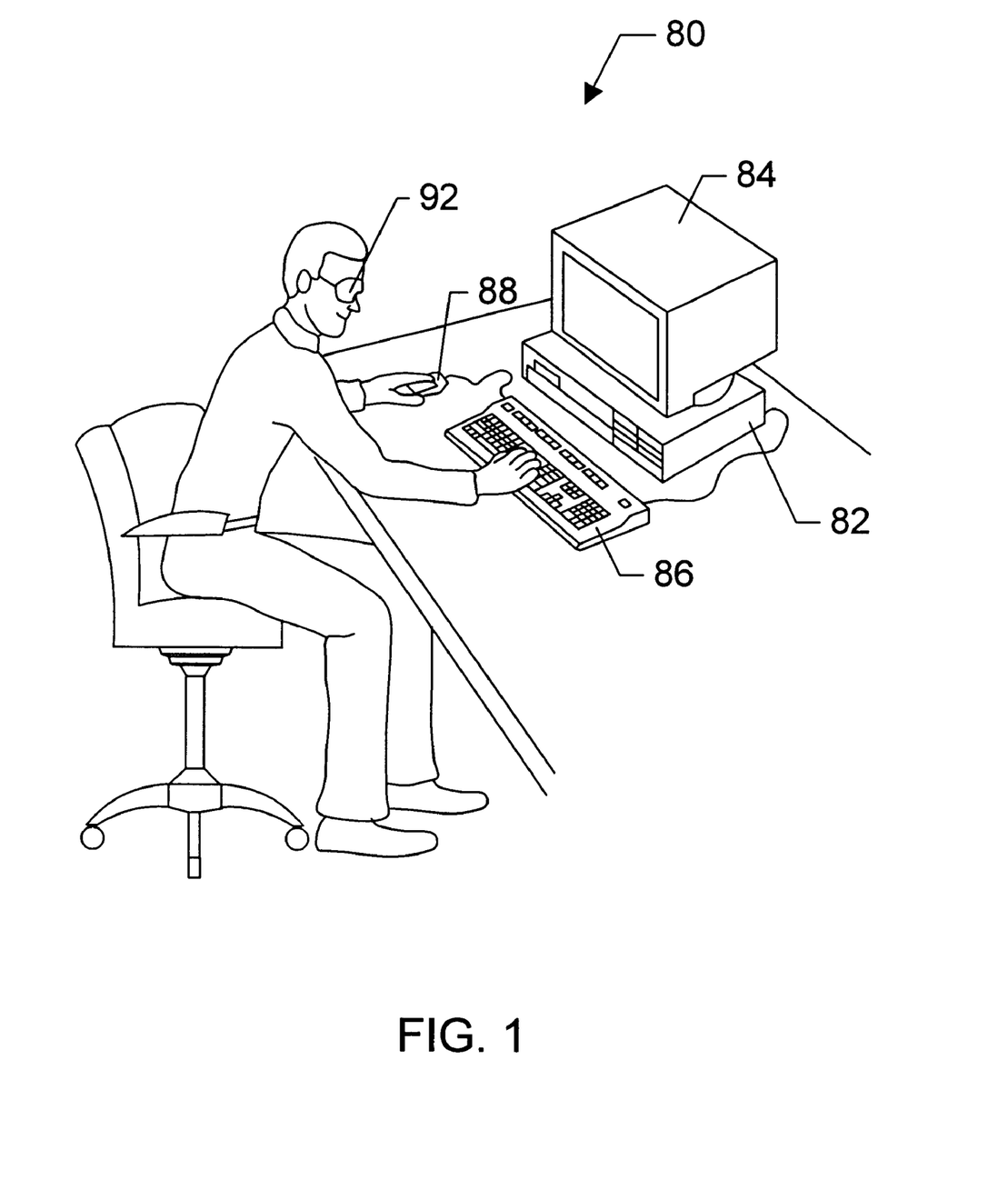
FIG. 1 illustrates a computer system which includes a three-dimensional (3-D) graphics accelerator capable of stereo display according to the present invention.

FIG. 1—Computer System

Referring now to FIG. 1, a computer system 80 which includes a three-dimensional (3-D) graphics accelerator according to the present invention is shown. As shown, the computer system 80 comprises a system unit 82 and a video monitor or display device 84 coupled to the system unit 82. Display device 84, in conjunction with stereo glasses 92, supports viewing in stereo mode. Computer system 80 is configured whereby a user wearing stereo glasses 92 may view images on display device 84 in stereo mode. Stereo glasses 92 preferably operate by allowing only one eye at a time to view display device 84. Stereo glasses 92 are synchronized to the refresh rate of display device 84 such that the view of the right eye is blocked when the left stereo pair image is being rendered, and vice-versa. Various input devices may be connected to the computer system, including a keyboard 86 and/or a mouse 88, or other input. Application software may be executed by the computer system 80 to display 3-D graphical objects on the display device 84 in stereo mode. As described further below, the 3-D graphics accelerator in the computer system 80 exhibits increased performance for displaying three dimensional graphical objects in stereo.

Figure 2:
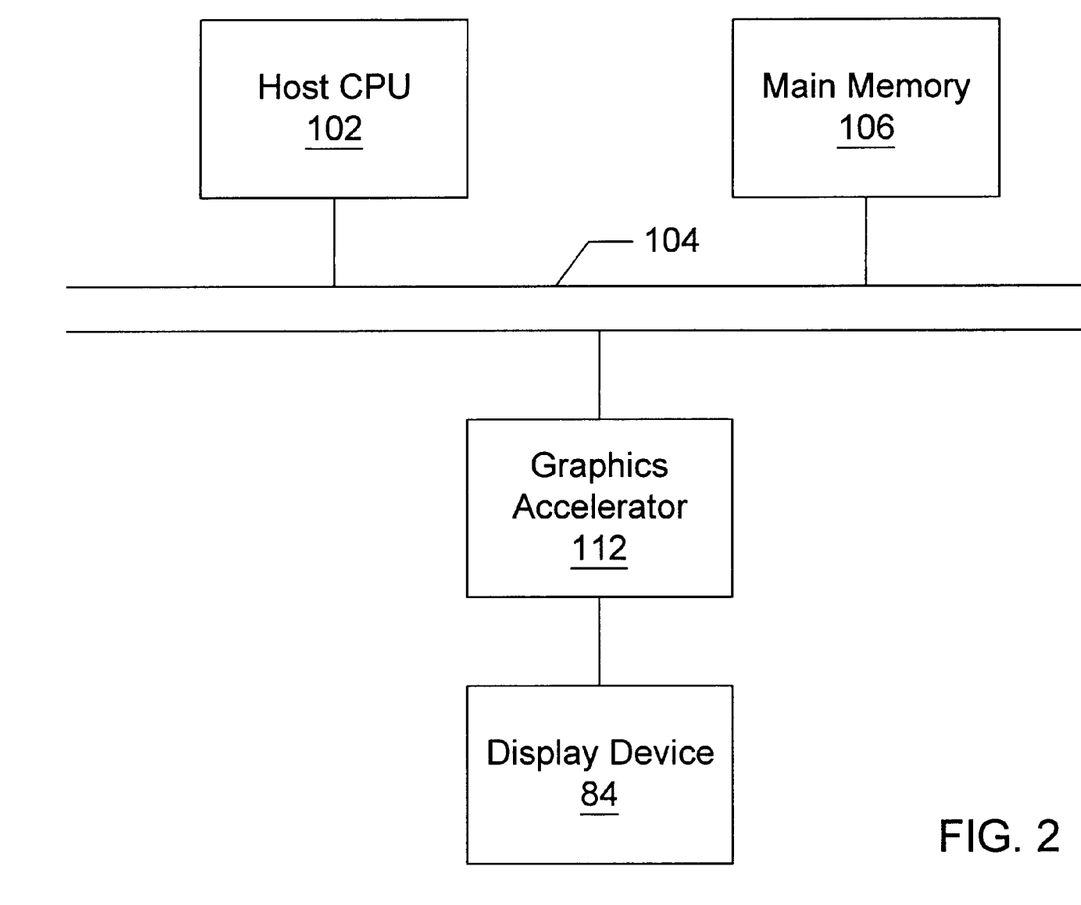
FIG. 2 is a simplified block diagram of the computer system of FIG. 1.

FIG. 2—Computer System Block Diagram

Referring now to FIG. 2, a simplified block diagram illustrating the computer system of FIG. 1 is shown. Elements of the computer system which are not necessary for an understanding of the present invention are not shown for convenience. As shown, the computer system 80 includes a central processing unit (CPU) 102 coupled to a high speed bus or system bus 104. A system memory 106 is also preferably coupled to the high speed bus 104.

The host processor 102 may be any of various types of computer processors, multi-processors and CPUs. The system memory 106 may be any of various types of memory subsystems, including random access memories and mass storage devices. The system bus or host bus 104 may be any of various types of communication or host computer buses for communication between host processors, CPUs, and memory subsystems, as well as specialized subsystems. In the preferred embodiment, the host bus 104 is the UPA bus, which is a 64 bit bus operating at 83 MHz.

A 3-D graphics accelerator 112 according to the present invention is coupled to the high speed memory bus 104. The 3-D graphics accelerator 112 may be coupled to the bus 104 by, for example, a cross bar switch or other bus connectivity logic. It is assumed that various other peripheral devices, or other buses, may be connected to the high speed memory bus 104, as is well known in the art. Further, the graphics accelerator 12 may be coupled through one or more other buses to bus 104. As shown, the video monitor or display device 84 which supports stereo viewing connects to the 3-D graphics accelerator 112.

The host processor 102 may transfer information to and from the graphics accelerator 112 according to a programmed input/output (I/O) protocol over the host bus 104. In the preferred embodiment, data is transferred from the system memory 106 to the graphics accelerator 112 using a CPU copy (bcopy) command. In an alternate embodiment, the graphics accelerator 112 accesses the memory subsystem 106 according to a direct memory access DMA) protocol, or through intelligent bus mastering.

A graphics application program conforming to an application programmer interface (API) such as OpenGL generates commands and data that define a geometric primitive such as a polygon for output on display device 84. Host processor 102 transfers these commands and data to memory subsystem 106. Thereafter, the host processor 102 operates to transfer the data to the graphics accelerator 112 over the host bus 104. Alternatively, the graphics accelerator 112 reads in geometry data arrays using DMA access cycles or bus mastering cycles over the host bus 104. In another embodiment, the graphics accelerator 112 is coupled to the system memory 106 through a direct port such as the Advanced Graphics Port (AGP) promulgated by Intel Corporation. As will be described below, graphics accelerator 112, when operating in stereo mode, renders a left and right eye image of the geometric primitive defined by the graphics application program. Thousands of such primitives may be used to render an entire display in stereo mode. Graphics accelerator 112 is advantageously configured to provide increased performance in stereo mode, including reduced data flow on host bus 104 and greater compatibility with applications having graphics data not originally encoded for stereo viewing.

Figure 3:
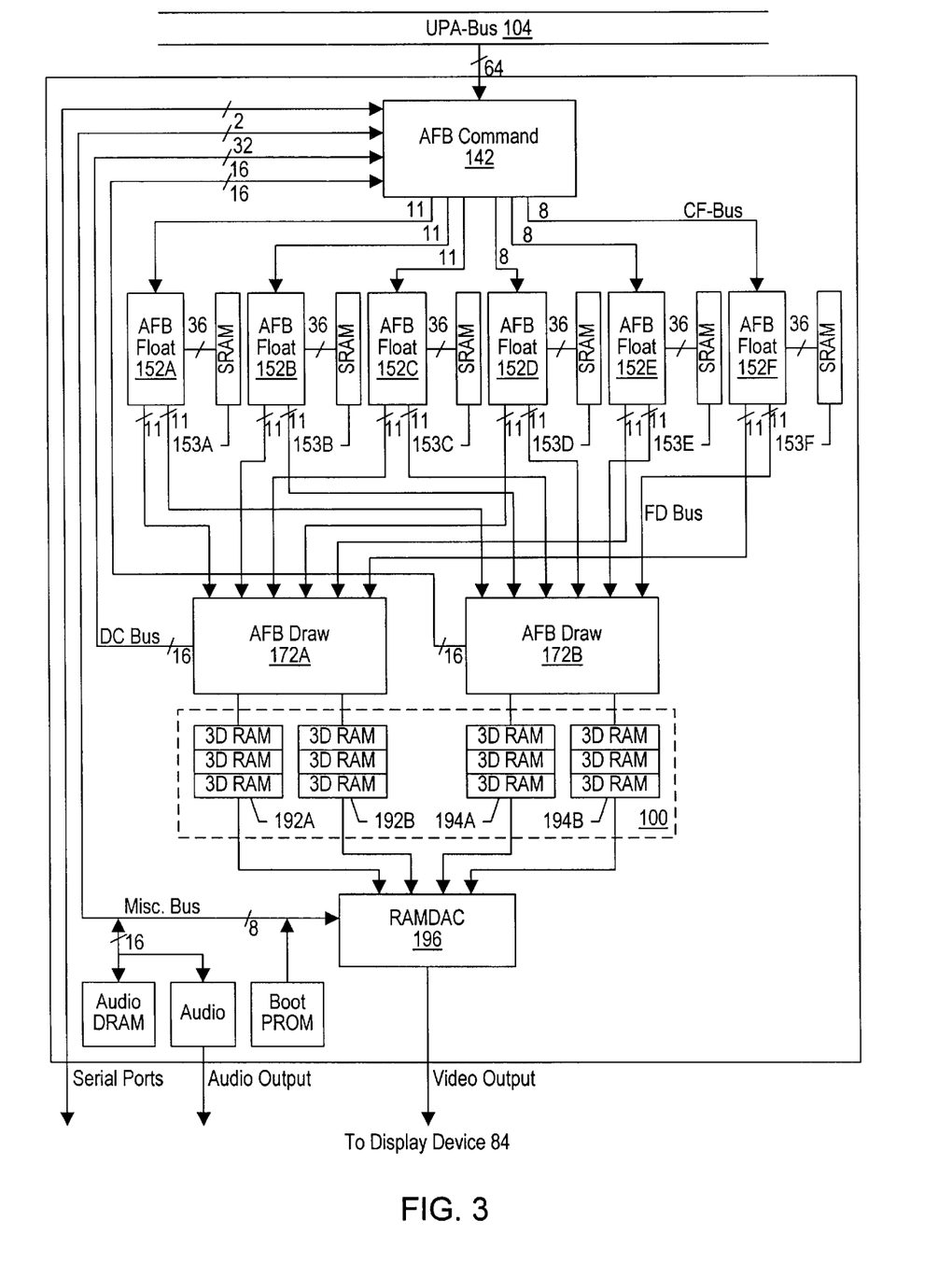
FIG. 3 is a block diagram illustrating the 3-D graphics accelerator according to the preferred embodiment of the present invention.

FIG. 3—Graphics Accelerator

Referring now to FIG. 3, a block diagram is shown illustrating the 3-D graphics accelerator 112 according to the preferred embodiment of the present invention. As shown, the 3-D graphics accelerator 112 is principally comprised of a command block 142, a set of floating-point processors 152A–152F, a set of draw processors 172A and 172B, a frame buffer 100 comprised of 3DRAM, and a random access memory/digital-to-analog converter (RAMDAC) 196.

As shown, the 3-D graphics accelerator 112 includes command block 142 which interfaces to the host bus 104. The command block 142 interfaces the graphics accelerator 112 to the host bus 104 and controls the transfer of data between other blocks or chips in the graphics accelerator 112. The command block 142 also pre-processes triangle and vector data and performs geometry data decompression when necessary.

The command block 142 interfaces to a plurality of floating point blocks 152. The 3-D graphics accelerator 112 preferably includes up to six floating point blocks labeled 152A–152F, as shown. The floating point blocks 152A–152F receive high level drawing commands and generate graphics primitives, such as triangles, lines, etc. for rendering three-dimensional objects on the screen. The floating point blocks 152A–152F perform transformation, clipping, lighting and set-up operations on received geometry data. Each of the floating point blocks 152A–152F connects to a respective memory 153A–153F. The memories 153A–153F are preferably 32 k×36-bit SRAM and are used for microcode and data storage.

Each of the floating point blocks 152A–F connects to each of two drawing blocks 172A and 172B. The 3-D graphics accelerator 112 preferably includes two draw blocks 172A and 172B, although a greater or lesser number may be used. The draw blocks 172A and 172B perform screen space rendering of the various graphics primitives and operate to sequence or fill the completed pixels into the 3DRAM array. The draw blocks 172A and 172B also function as 3DRAM control chips for the frame buffer. The draw processors 172A and 172B concurrently render an image into the frame buffer 100 according to a draw packet received from one of the floating-point processors 152A–152F, or according to a direct port packet received from the command processor 142.

Each of the floating point blocks 152A–F preferably operates to broadcast the same data to the two drawing blocks 172A and 172B. In other words, the same data is always on both sets of data lines coming from each floating point block 152. Thus, when the floating point block 152A transfers data, the floating point block 152A transfers the same data over both parts of the FD-bus to the draw processors 172A and 172B.

Each of the respective drawing blocks 172A and 172B couple to frame buffer 100, wherein frame buffer 100 comprises four banks of 3DRAM memory 192A–B, and 194A–B. The draw block 172A couples to the two 3DRAM banks 192A and 192B, and the draw block 172B couples to the two 3DRAM banks 194A and 194B, respectively. Each bank comprises three 3DRAM chips, as shown. The 3DRAM memories or banks 192A–B and 194A–B collectively form the frame buffer, which is 1280×1024 by 96 bits deep. The frame buffer stores pixels corresponding to 3-D objects which are rendered by the drawing blocks 172A and 172B.

Each of the 3DRAM memories 192A–B and 194A–B couple to a RAMDAC (random access memory digital-to-analog converter) 196. The RAMDAC 196 comprises a programmable video timing generator and programmable pixel clock synthesizer, along with cross-bar functions, as well as traditional color look-up tables and triple video DAC circuits. The RAMDAC in turn couples to the video monitor 84.

The command block is preferably implemented as a single chip. Each of the "floating point blocks" 152 are preferably implemented as separate chips. In the preferred embodiment, up to six floating point blocks or chips 152A–F may be included. Each of the drawing blocks or processors 172A and 172B also preferably comprise separate chips. For more information on different aspects of the graphics accelerator architecture of the preferred embodiment, please see related co-pending application Ser. No. 08/673,492 entitled "Three-Dimensional Graphics Accelerator With Direct Data Channels for Improved Performance", and related co-pending application Ser. No. 08/673,491 entitled "Three-Dimensional Graphics Accelerator Which Implements Multiple Logical Buses Using Common Data Lines for Improved Bus Communication", both filed on Jul. 1, 1996.

As described above, command block 142 interfaces with host bus 104 to receive graphics commands and data from host CPU 102. When stereo mode is enabled by host CPU 102 for a particular primitive received over host bus 104, command block 142 transfers the information describing the primitive to one of floating point processors 152A–F, along with an indication of stereo mode. The selected floating point processor 152 performs two series of operations on the received primitive, one for the left eye view and one for the right eye view. Two primitives corresponding to these left and right eye views are conveyed to draw processors 172 for storage in frame buffer 100, which, in one embodiment, may be partitioned in half to accommodate stereo viewing. The general operation of floating point processors 152 is described with reference to FIG. 4, while the operation of the floating point processors 152 in stereo mode described with reference to FIGS. 5–7.

Figure 4:
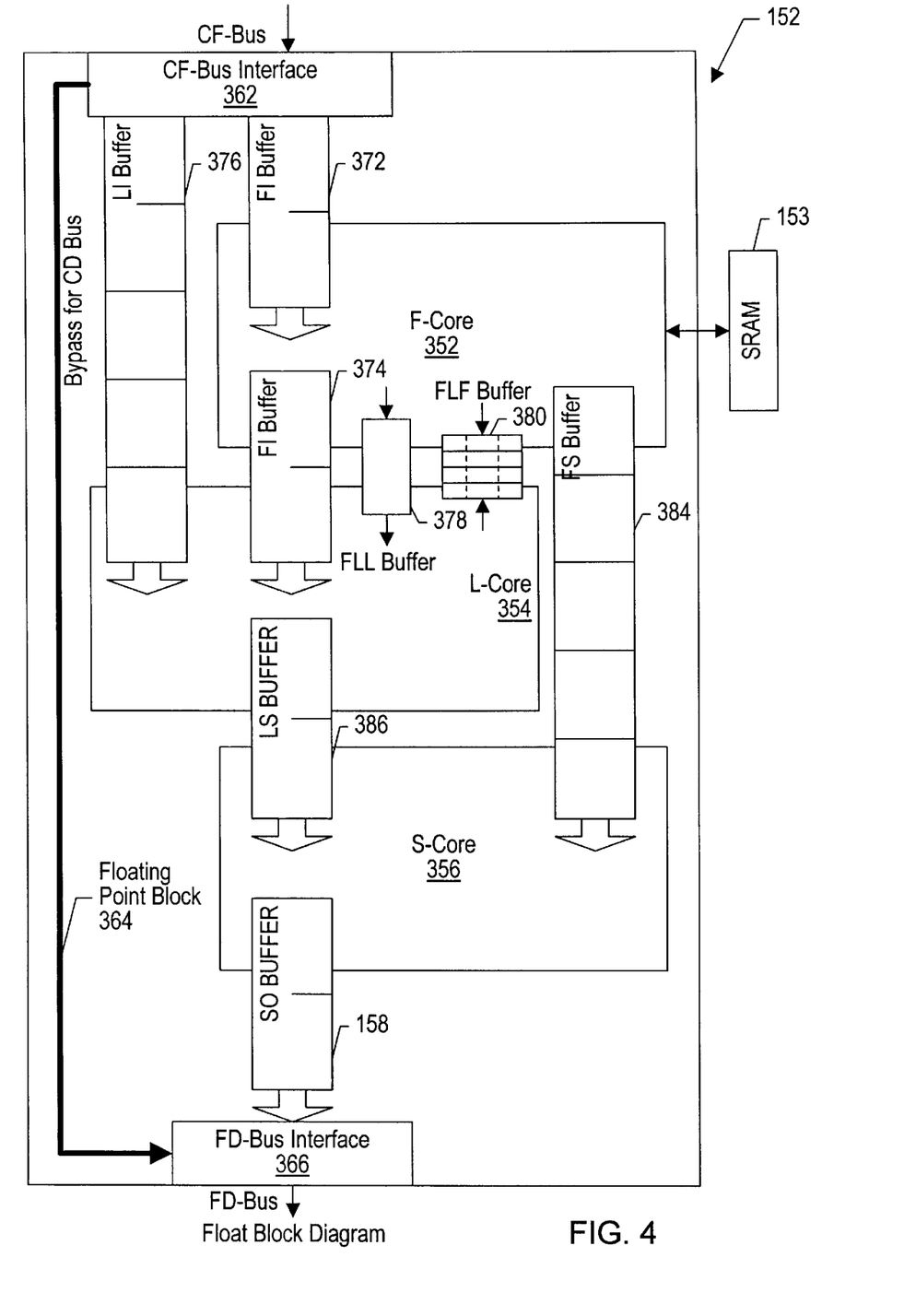
FIG. 4 is a block diagram illustrating one of the floating point processors in the 3-D graphics accelerator according to the preferred embodiment of the present invention.

FIG. 4—Floating Point Processor Block Diagram

Referring now to FIG. 4, a block diagram illustrating one of the floating point processors 152 according to the preferred embodiment of the present invention is shown. Each of the respective floating point processors 152A–152F are preferably identical, and thus only one is described here for convenience. As shown, each of the floating point blocks 152 includes three main functional units or core processors, these being floating point core (F-core) 352, lighting core (L-core) 354, and setup core (S-core) 356. The F-core block 352 is coupled to receive data from the CF-bus transferred from the Command block 142. The F-core block 352 provides output data to each of the L-core block 354 and the S-core block 356. The L-core block 354 also provides data to the S-core block 356. The S-core block 356 provides output data to the FD bus.

The F-core block 352 performs all floating point operations, including geometry transformation, clip testing, face determination, perspective division, and screen space conversion. The F-core block 352 also performs clipping when required. In the preferred embodiment, the F-core block 352 is fully programmable, using a 36-bit micro instruction word stored in a 32 k word SRAM 153.

The L-core block 354 performs substantially all lighting calculations using on-chip RAM-based microcode. The L-core block 354 also includes an efficient triple-word design for more efficient lighting calculations. This triple-word design operates with a 48-bit data word comprising 16-bit fixed point values. Thus one instruction can perform the same function on all three color components (RGB) or all three components of a normal ($N_x$, $N_y$, and $N_z$) in one cycle. The math units comprised in the L-core block 354 automatically clamp values to the allowed ranges, thus requiring no additional branches.

The S-core block performs setup calculations for all primitives. These set-up calculations involve computing the distances in multiple dimensions from one vertex to another and calculating slopes along that edge. For triangles, the slopes of the Z depth, the color, and the UV (for texture) are also computed in the direction of a scan line. For more information on the internal architecture of the floating point blocks, see related co-pending application Ser. No. 08/676,096 titled "Floating Point Processor for a Three-Dimensional Graphics Accelerator Which Includes Floating Point, Lighting, and Set-up Cores for Improved Performance", filed Jul. 1, 1996, now U.S. Pat. No. 5,745,125.

As shown, each of the floating point blocks 152 includes CF-bus interface logic 362 which couples to the CF-bus. Each of the floating point blocks 152 includes FD-bus interface logic 366 which couples to the FD-bus. Each floating point block 152 includes a bypass bus or data path 364 which serves as the data transfer path through a respective floating point block 152 for the CD bus. Data which is sent over the CD bus, i.e., which is sent directly to the FD bus, travels on the data transfer bus 364, thus bypassing the floating point logic comprised in the floating point block 152.

In general, data which is provided to the floating point block 152 can have one of three destinations, these being the F-core block 352, the L-core block 354, or directly out to the FD bus, i.e., a CD bus transfer. In the preferred embodiment, data which is destined for the F-core block 352 comprises 32-bit words, including 32-bit IEEE floating point numbers and other 32-bit data. Data destined for the L-core block 354 comprises 48-bit words comprising three 16-bit fixed point numbers.

As shown in FIG. 4, the floating point block 152 includes a plurality of input and output buffers which provide communication between the F-core block 352, L-core block 354, and S-core block 356. As depicted, the floating point block 152 includes a float input buffer (FI buffer) 372 which receives data from the CF-bus which was provided by the command block 142. The FI buffer 372 is double buffered and holds 32 32-bit entries in each buffer. The first word, word zero, stored in the FI buffer 372 comprises an op code which informs the F-core block 352 which microcode routine to dispatch for the received geometric primitives. Only the header and X, Y and Z coordinates are provided to this buffer when processing geometric primitives The floating point block 152 also includes an F-core to L-core buffer (FL buffer) 374. The FL buffer 374 is double-buffered and holds 16 16-bit entries in each buffer. The F-core block 352 operates to write or combine three F-core words into one L-core word which is provided to the FL buffer 374. From the L-core perspective, each buffer in the FL buffer 374 appears as five 48-bit entries. During lighting operations, three X, Y, Z coordinates are sent from the F-core block 352 through the FL buffer 374 to the L-core block 354. These three X, Y, Z coordinates are used to compute eye direction.

The floating point block 152 includes an L-core input buffer (LI buffer) 376 which receives data sent across the CF-bus which was provided from the command block 142 and provides this data to the L-core block 354. The LI buffer 376 comprises five buffers, each of which hold seven 48-bit entries. These seven 48-bit entries comprise three vertex normals, three vertex colors and one word with three alpha values. The FI buffer 372 and the LI buffer 376 collectively comprise the floating point block input buffer.

The floating point block 152 also includes an FLL buffer 378, which connects between the F-core block 352 and the L-core block 354. The FLL buffer 378 is a FIFO used for transmitting lighting and attenuation factors from the F-core block 352 to the L-core block 354. These attenuation factors comprise three X,Y,Z position values, three attenuation values, three ambient light values, and one attenuation shift word containing three packed values. An FLF buffer 380 is also provided between the F-core block 352 and the L-core block 354. The FLF buffer is a bi-directional buffer used for communicating data between the F-core block 352 and the L-core block 354 under F-core control.

An L-core to S-core buffer (LS buffer) 386 is coupled between the L-core block 354 and the S-core block 356. The LS buffer 386 is a double buffer with each buffer holding four 48-bit words.

The floating point block 152 also includes an F-core to S-core buffer (FS buffer) 384 which is used for transferring data from the F-core block 352 to the S-core block 356. The FS buffer comprises five buffers which each hold 32 32-bit values. These five buffers are designed to match the pipeline stages of the L-core block 354, these being the two FL buffers, the two LS buffers, plus one primitive which may be stored in the L-core block 354. Data transferred from the F-core block 352 through this buffer to the S-core block 356 includes a dispatch code that indicates which microcode procedure to run in the S-core block 356.

Finally, the floating point block 152 includes an S-core output buffer (SO buffer) 158 which is coupled between the S-core block 356 and the FD bus interface 366. The SO buffer 158 collects data to be sent across the FD bus to the respective draw processors 172A–172B. The SO buffer 158 is double buffered and holds 32 32-bit words in each buffer. The SO buffer 158 holds up to two primitives comprising fixed point data in the order needed by the respective draw processors 172A–172B. S-core block 356 conveys additional status information along with the fixed point data to draw processors 172. For example, a status bit is conveyed with each entry indicating whether or not a given primitive is the last of a group of related primitives. The SO buffer 158 includes a separate status register which indicates how many words are valid so that the minimum number of cycles are used to transfer the data across the bus. The SO buffer 158 comprises the floating point block output buffer 158.

Stereo Mode Operation

Referring again to FIG. 2, the operation of stereo mode for graphics accelerator 112 is described according to one embodiment. Initially, host CPU 102 calculates view transformation matrices according to the number of desired channels of stereo display. For example, in left/right stereo display, a set of left and right view transformation matrices are generated. These transformation matrices convert the representation of a geometric primitive in model space coordinates to clipping space coordinates (also called eye coordinates in some systems). The view transformation matrices account for the user's vantage point, and are separated into two different sets of matrices because of the binocular disparity caused by left and right eye views.

These sets of matrices are stored in main memory 106, and are transferred to graphics accelerator 112 along with header information identifying which view the matrices represent (left or right). As shown in FIG. 3, command block 142 receives this data, and transfers the matrices to one or more floating point processors 152. One subset of the received matrices is stored in F-core block 352; another subset is stored in L-core block 354. These sets of matrices are different but related. The matrices stored in L-core block 354 preferably include only the rotational component of the matrices stored in F-core block 352 (translation, scale, and perspective components are preferably not included). Within both F-core block 352 and L-core block 354, left and right view transformation matrices are stored separately.

Figure 5:
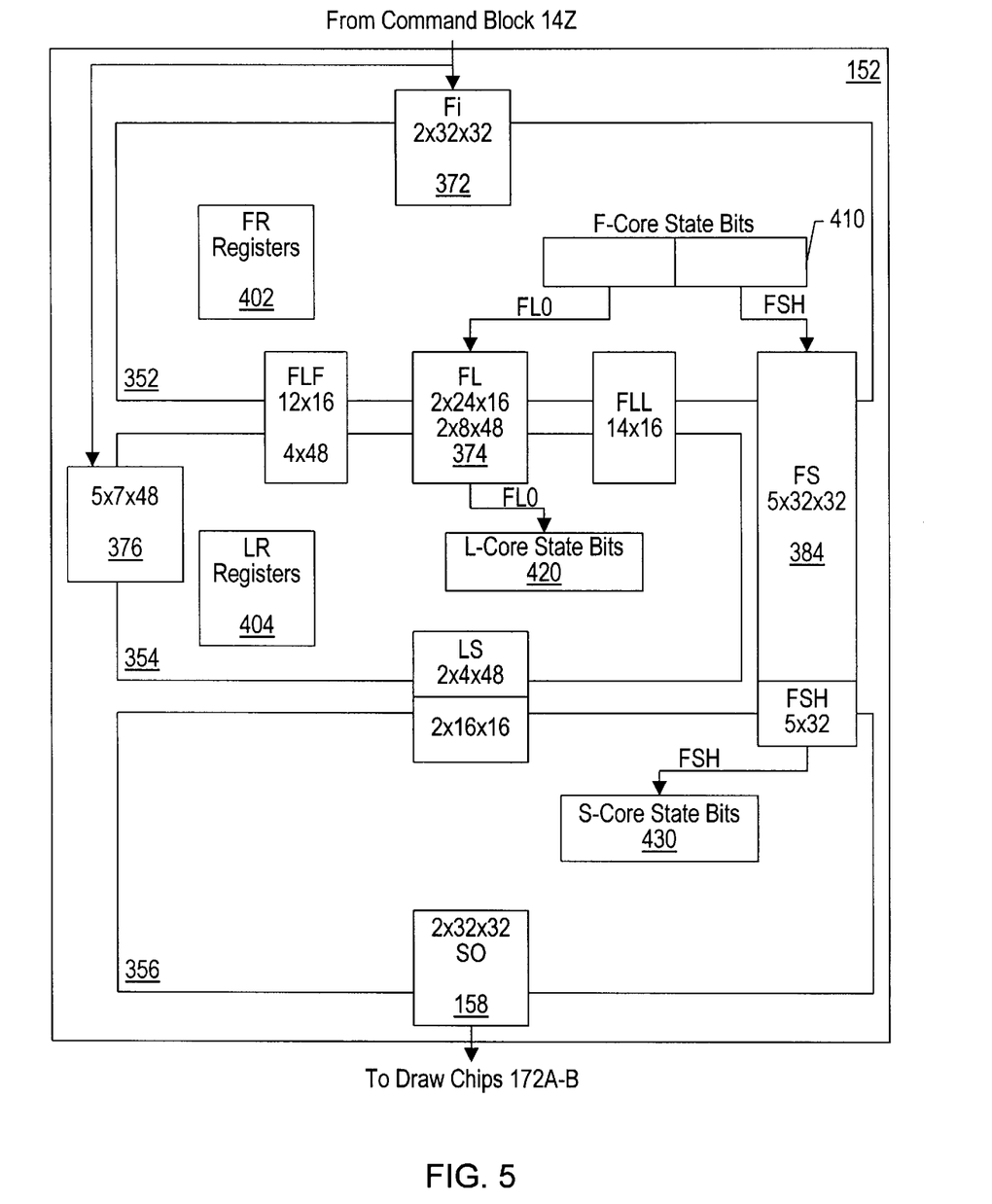
FIG. 5 is a block diagram illustrating portions of the floating point processors in the 3-D graphics accelerator according to the preferred embodiment of the present invention.
Figure 6:
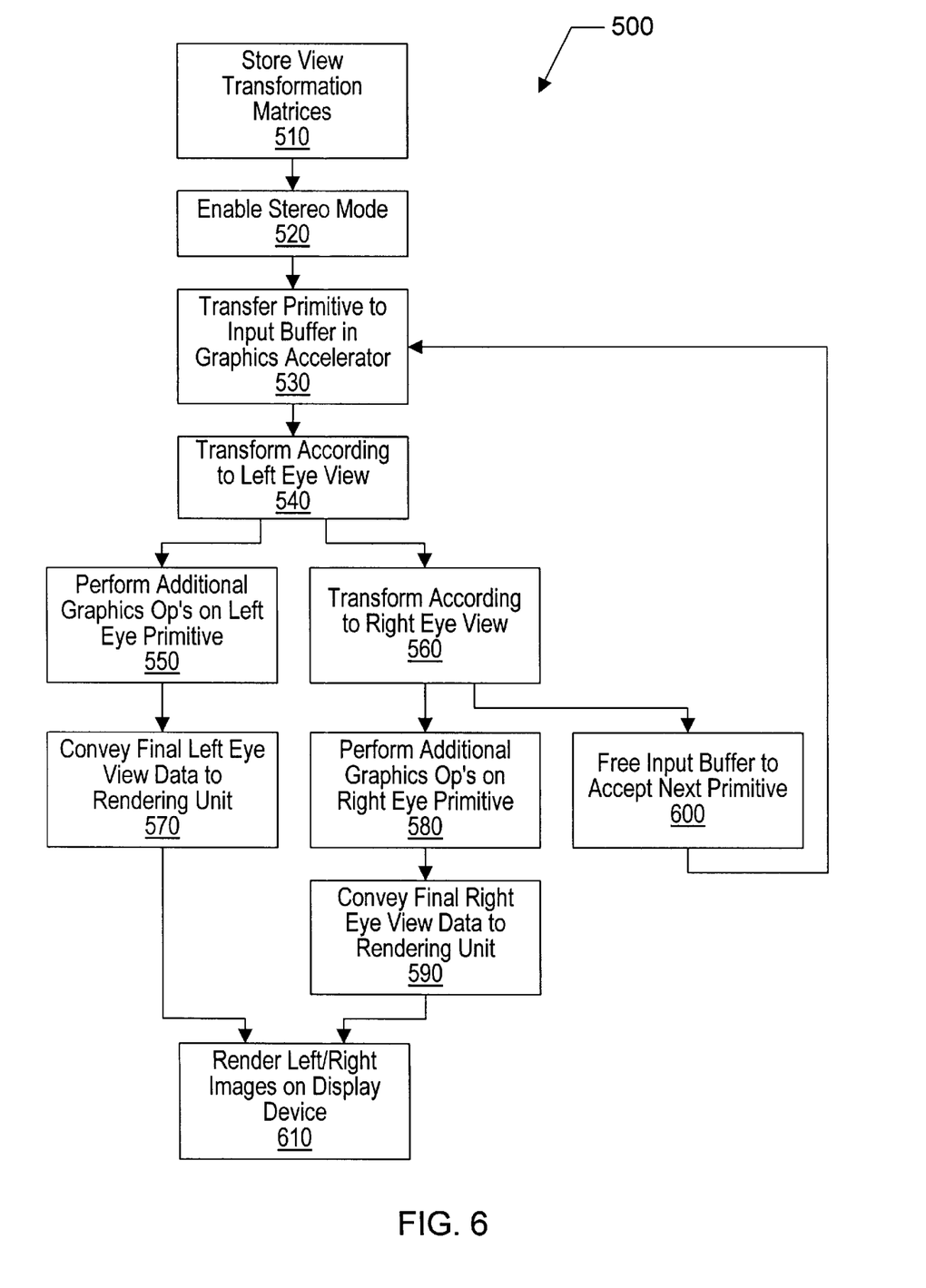
FIG. 6 is a flowchart illustrating a method of performing single-pass stereo operations in one embodiment of the present invention.

Referring now to FIG. 5, a block diagram is shown illustrating portions of the floating point processor which effectuates single-pass stereo. In FIG. 6, a flowchart is shown illustrating one embodiment of a method (method 500) for performing single-pass stereo operations in a 3-D graphics accelerator In a step 510, the view transformation matrices are stored within F-core block 352. The view transformation matrices are stored in one bank of FR registers 402 for the left eye view, and in another bank of FR registers 402 for the right eye view. Within L-core block 352, the left eye vector matrix is stored in one group of LR registers 404, while the right eye vector matrix is stored in another group of LR registers 404. In one embodiment, the same microcode routines perform both left and right eye transformations, with the appropriate transformation matrices selected by hardware by F-core block 352 and L-core block 354. The left and right view transformation matrices typically apply to hundreds of successive geometric primitives, and thus do not have to be written to command block 142 prior to each geometric primitive. When a new set of view transformation matrices are desired, the old copies in F-core block 352 and L-core block 354 may be overwritten.

With view transformation matrices stored to one of floating point processors 152, host CPU 102 now enables stereo mode in a step 520. In one embodiment, this is performed by setting a stereo bit in F-core state bits register 410. Once stereo mode is enabled, geometric primitives subsequently transferred from host CPU 102 are processed in stereo mode. Such operation continues until stereo mode is de-activated by clearing the stereo bit in register 410.

Next, geometry data is transferred from host CPU 102 to graphics accelerator 112, and more specifically, floating point processors 152 in a step 530. The geometry data is received by F-core block 352 (in FI buffer 372) and L-core block 354 (in LI buffer 376). When the header word for a given geometric primitive is received by F-core block 352, a microcode command is employed to set a bit in F-core state bits register 410 which eye view is currently being performed. (The particular eye view that is transformed first is determined by microcode, and is thus programmable). In one embodiment, the left eye transformation is performed first.

F-core block 352 interfaces with command block 142 (more particularly, the command-float bus interface) by means of a need/free buffer handshake. Once a primitive is loaded into FI buffer 372, a signal is asserted to F-core block 352 which indicates that valid data is present in the input buffer, as well as the type of operation to be performed. In this case, F-core block 352 performs a left eye transformation in step 540 on the geometry data in FI buffer 372 associated with the geometric primitive, employing the view transformation matrices from the left view transformation matrices stored in FR registers 402. At the end of the microcode routine which effectuates the left view transformation, a "free FI" command is executed by F-core block 352. In normal (non-stereo) mode, execution of this command causes the current primitive to be removed from FI buffer 372, with operation continuing with the next primitive in the FIFO. In stereo mode (as defined in F-core state bits register 410), however, the "free FI" command does not remove the primitive from the buffer. As will be described below, the same primitive is transformed again by F-core block 352, this time with the view transformation matrices from the other eye, preferably the right eye view transformation matrices. Operation on the left view transformed geometry data continues in step 550 with clip checking, face determination, perspective divide, and screen space conversion in F-core block 352, preferably in parallel with the right eye view transformation performed in step 560. It is noted that the same microcode routines may be employed by F-core block 352 for handling both stereo and non-stereo mode primitives. For this reason, less microcode storage is required, and a more efficient implementation is achieved.

Data corresponding to X, Y, and Z coordinates of the left eye transform is conveyed to L-core block 354 and S-core block 356. An instruction recognized by F-core block 352 is employed to additionally transfer stereo mode state bits to L-core block 354 and S-core block 356. In one embodiment, the transferred stereo mode bits include a stereo mode bit and a "right" bit (which indicates either left or right view processing). In L-core block 354, these stereo mode bits are stored to FL register bank 374, which is preferably a FIFO. When these stereo mode bits reach the bottom of FIFO 374, a "need I" instruction, executed by L-core block 354, transfers these bits from FLO to L-core state bits register 420 when the transformed left view data is transferred from F-core block 352. Similarly, the same stereo mode bits written to FL buffer 374 are also written to FS buffer 384.

As described above, FS buffer 384 is synchronized with the pipeline of data through FL buffer 374, L-core block 354, and LS buffer 386. Lighting computations are performed on the normals, colors, and X, Y, and Z coordinates of the left eye primitive, with the results conveyed through LS buffer 386 to S-core block 356. FS buffer 384 is configured such that when the lighting data for the left eye view reaches S-core block 356, the corresponding stereo mode bits are at the "bottom" of FS buffer 384. Like L-core block 354, a "need I" instruction executed by S-core block then transfers mode information (including the state of the stereo-related bits) to S-core state bits register 430.

Subsequent to transferring data corresponding to the results of the left eye view transform, F-core block 352 frees a location both in FS buffer 384 and FL buffer 374. F-core block 352 is now set to operate on a new primitive. Since a stereo mode bit is set in F-core state bits register 410 and the "right" mode in the same register is not set, F-core block 352 again dispatches to the execute stage of its pipeline from location FIO, which is the bottom of FIFO 372. The dispatch to the execute stage toggles the right mode bit to indicate processing is now proceeding in step 560 according to the right eye view transformation matrices. The same microcode routine is executed for the left eye view transformation, saving space in SRAM 153. Since the right mode bit is now set, however, the registers utilized for the transformation are automatically mapped to a different group of registers within FR registers 402 than are used in the left eye transformation.

The X, Y, and Z data corresponding to the right eye view transformation is conveyed to L-core block 354 and S-core block 356 in step 580 for additional graphics operations. Again, the "free FI" command is executed by F-core block 352. This time, however, a location in FI buffer 372 is freed in step 600, allowing more data to be received from command block 142. A "last output" command causes a header bit to be is sent to S-core block 356 indicating the primitive is the last of the stereo pair. Additionally, a "free FS" command causes the right mode bit to toggle back to represent left view transformation, in preparation for receiving the next stereo mode primitive.

As described above, when receiving transformed data (either left or right view), L-core block 354 transfers header data from FLO register in FL buffer 374 to L-core state bits register 420. This header information corresponds to primitive data upon which lighting computations are currently being performed on data in FL buffer 374 and LI buffer 376. The lighting calculations for a given primitive are first performed according to the left eye vector matrix. Once lighting computations are performed, a "free LI" command is performed. Like the "free FI" command performed by F-core block 352, the "free LI" command does not free a location in LI buffer 376 when the right mode bit indicates left view processing and stereo mode is enabled. Instead, the "free LI" command acts like a no-op. Subsequent to the lighting computations being performed for the left eye view, an L-core command is executed which causes L-core block 354 to dispatch the same microcode routine to operate on the same LI buffer 376 data, only this time using the right eye vector matrix. Additionally, a new value of the right mode bit which indicates right view processing comes to L-core block 354 from F-core block 352 via FL buffer 374, and is stored in L-core state bits register 420.

For the second pass (right eye) for a given primitive in L-core block 354, the same lighting calculations are performed as with the left eye vector matrix. This time the "free LI" command, detecting stereo mode enabled as well as right view processing, frees a location in LI buffer 376. Additional data may now be received from command block 142. Results of the lighting computation for the right eye view are transferred to S-core block 356 via LS buffer 386.

Standard setup calculations are performed by S-core block 356 on both left and right eye primitives conveyed from L-core block 354. These primitives are conveyed to the rendering unit (i.e., draw processors 172A–B) in step 570 (for the left eye data) and step 590 (for right eye data), along with a header value indicating which eye view is represented. Throughout the rasterization process, this left/right header value remains with the primitive until final pixel processing. Ultimately, the frame buffer 100 logic writes each pixel to either the left or right stereo buffer depending in accordance with the header value. (When stereo mode is enabled, half of frame buffer 100 is dedicated to storing left eye images, with the other half dedicated to storing right eye images. If stereo mode is not enabled, the frame buffer 100 logic writes each pixel to both buffers). In one embodiment, draw processors 172 and frame buffer 100 are first initialized to operate in stereo mode before stereo pairs may be rendered on display device 84 in step 610.

Figure 7:
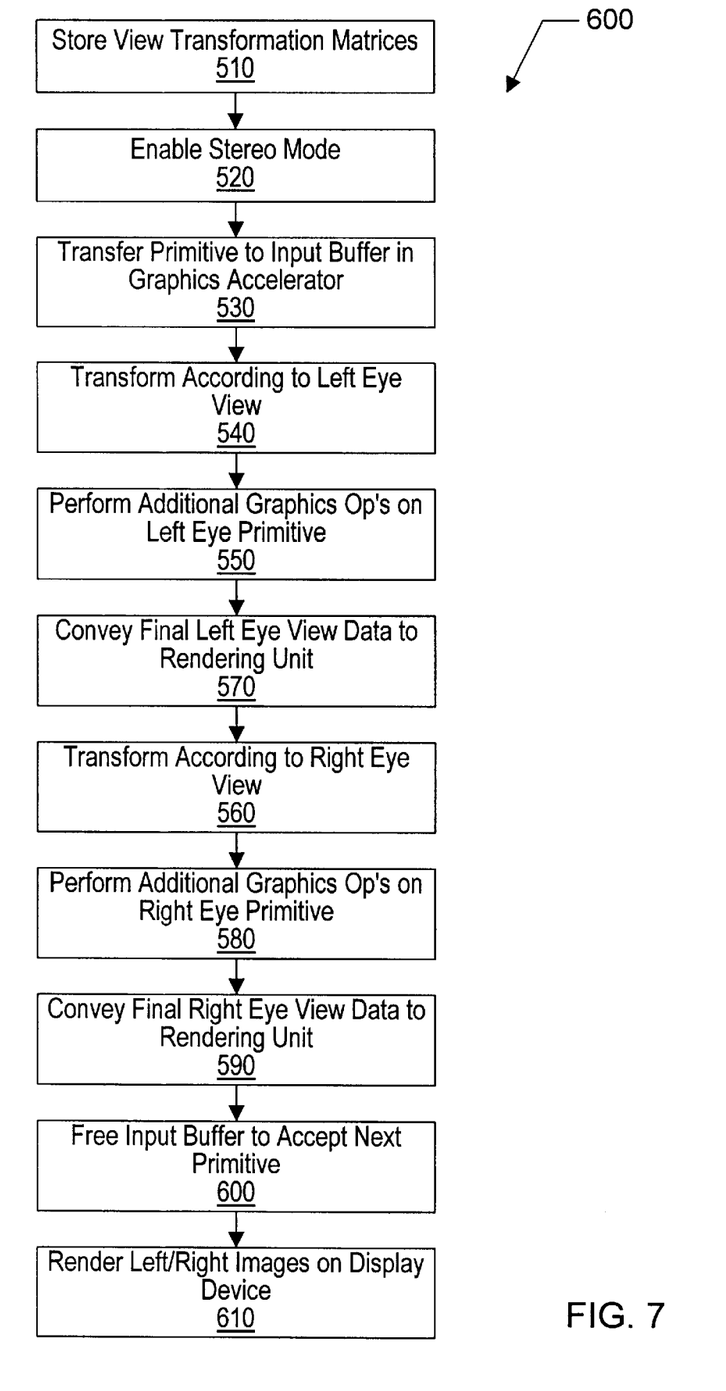
FIG. 7 is a flowchart illustrating a method of performing single-pass stereo operations in the preferred embodiment of the present invention.

It is noted that in one embodiment, cores 352, 354, 356 of floating point processors 152 are pipelined with respect to processing of the left and right eye transformations. Consequently, various steps in method 500 (e.g., steps 550 and 560) may wholly or partially overlap. Although several steps of method 500 are shown as being performed concurrently in FIG. 6, in other embodiments these steps may be performed sequentially. For example, FIG. 7 depicts an alternative embodiment, method 600. In method 600 (which includes the same steps as method 500), the left eye transformations are completed before processing of the right eye view. Hence, steps 540, 550, and 570 are completed before steps 560, 580, and 590. The input buffer is freed in step 600 after right eye processing is finished, and both images are rendered in the final step 610. It is noted that method 600 is the preferred embodiment of the present invention.

Although the system and method of the present invention has been described in connection with the described embodiments, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for rendering a three-dimensional geometric primitive in a stereo format in a graphics system, the method comprising:

receiving the three-dimensional geometric primitive;

transforming the three-dimensional geometric primitive into a first transformed geometric primitive according to a first view;

rendering the first transformed geometric primitive;

transforming the three-dimensional geometric primitive into a second transformed geometric primitive according to a second view; and rendering the second transformed geometric primitive according to a second view;

wherein said rendering the first transformed geometric primitive and said rendering the second transformed geometric primitive operate to render the three-dimensional geometric primitive in the stereo format.

2. The method of claim 1, wherein said three-dimensional geometric primitive is received in a non-stereo format and comprises one or more vertices, wherein each vertex includes xyz-coordinate information.

3. The method of claim 1, wherein, in rendering the three-dimensional geometric primitive in the stereo format, the geometric primitive is received only once by the graphics system.

4. The method of claim 1, further comprising:

storing the three-dimensional geometric primitive in a buffer at a time after said receiving;

wherein said transforming said three-dimensional geometric primitive into a second transformed geometric primitive according to said second view includes accessing the stored three-dimensional geometric primitive from said buffer.

5. The method of claim 1, wherein said three-dimensional geometric primitive comprises a portion of an object, wherein said three-dimensional object comprises a plurality of three-dimensional geometric primitives;

wherein said receiving the three-dimensional geometric primitive, said transforming according to said first view, said transforming according to said second view, said rendering the first transformed primitive, and said rendering the second transformed primitive are repeated for each of said plurality of three-dimensional geometric primitives to render said object in stereo format.

6. The method of claim 1, wherein said transforming the three-dimensional geometric primitive according to said first view includes transforming said three-dimensional geometric primitive using a first plurality of view transformation matrices, wherein said first plurality of view transformation matrices correspond to a first eye of a viewer;

wherein said transforming the three-dimensional geometric primitive according to said second view includes transforming said three-dimensional geometric primitive using a second plurality of view transformation matrices, wherein said second plurality of view transformation matrices correspond to a second eye of a viewer.

7. The method of claim 1, wherein said three-dimensional geometric primitive is a triangle.

8. The method of claim 1, wherein said first transformed geometric primitive is a first element of a stereo pair, and wherein said second transformed geometric primitive is a second element of the stereo pair;

wherein said rendering the first transformed geometric primitive and said rendering the second transformed geometric primitive operates to render said stereo pair on a display screen, wherein said rendered stereo pair effectuates a stereo mode to a viewer.

9. The method of claim 1, further comprising:

performing additional graphics operations on said first transformed geometric primitive during said transforming said three-dimensional geometric primitive into said second transformed primitive.

10. The method of claim 6, wherein said first plurality of view transformation matrices are stored in a first memory area;

wherein said second plurality of view transformation matrices are stored in a second memory area;

the method further comprising:

maintaining a pointer which points to either said first plurality of view transformation matrices in said first memory area or said second plurality of view transformation matrices in said second memory area, wherein said pointer points to said first plurality of view transformation matrices prior to said transforming said geometric primitive using said first plurality of view transformation matrices, and wherein said pointer is adjusted to point to said second plurality of view transformation matrices prior to said transforming said geometric primitive using said second plurality of view transformation matrices.

11. The method of claim 1, further comprising: enabling a stereo mode prior to said rendering.

12. A method for rendering a three-dimensional geometric primitive in a stereo format in a graphics system, the method comprising:

receiving the three-dimensional geometric primitive and storing the geometric primitive in a buffer;

transforming said three-dimensional geometric primitive using a first plurality of view transformation matrices, wherein said first plurality of view transformation matrices correspond to a first eye of a viewer, wherein said transforming produces a first transformed geometric primitive, wherein said first transformed geometric primitive is a first element of a stereo pair;

transforming said three-dimensional geometric primitive using a second plurality of view transformation matrices, wherein said second plurality of view transformation matrices correspond to a second eye of a viewer, wherein said transforming said geometric primitive using said second plurality of view transformation matrices produces a second transformed geometric primitive, wherein said second transformed geometric primitive is a second element of said stereo pair;

rendering said stereo pair on a display screen, wherein said rendered stereo pair effectuates a stereo mode to a viewer.

13. The method of claim 12, wherein data corresponding to said geometric primitive is received in a non-stereo format.

14. The method of claim 13, wherein the data corresponding to the geometric primitive is only received once by the graphics system.

15. The method of claim 14, further comprising: wherein said transforming said geometric primitive using said first plurality of view transformation matrices and said transforming said geometric primitive using said second plurality of view transformation matrices each include accessing the geometric primitive from said buffer.

16. A computer system configured to render three-dimensional geometric primitives in a stereo format, comprising:

a bus for transferring data;

a memory coupled to the bus for storing data corresponding to three-dimensional geometric primitives;

a graphics device coupled to the bus, wherein the memory is operable to transfer said data corresponding to three-dimensional geometric primitives on said bus to the graphics device;

a display screen coupled to the graphics device, wherein the graphics device is operable to render objects in stereo mode on the display screen;

wherein the graphics device includes:

a buffer for storing data corresponding to a received geometric primitive to be rendered in the stereo format;

a rendering unit coupled to the buffer which is operable to access the received three-dimensional geometric primitive from said buffer; wherein the rendering unit is configured to render the received three-dimensional geometric primitive according to a first view and render the received geometric primitive according to a second view; wherein the rendering unit operates to render the received geometric primitive in the stereo format.

17. The computer system of claim 16, wherein said data corresponding to the received geometric primitive is received by the graphics device in a non-stereo format.

18. The computer system of claim 17, wherein the memory transfers said data corresponding to the received geometric primitive to the graphics device only once.

19. The computer system of claim 17, wherein said geometric primitive comprises a portion of an object, wherein said object comprises a plurality of geometric primitives;

wherein the memory is operable to transfer said plurality of geometric primitives on said bus to the graphics device;

wherein the buffer is operable to store said plurality of geometric primitives;

wherein said rendering unit is operable to access each of said plurality of geometric primitives from said buffer; wherein the rendering unit is configured to render each of said plurality of geometric primitives according to said first view and render each of said plurality of geometric primitives according to said second view to render said object in stereo format to a viewer.

20. The computer system of claim 17, wherein the graphics device further includes:

memory for storing left view transformation matrices and right view transformation matrices; and a transformation unit coupled to the memory and to the buffer which is configured to generate a first transformed geometric primitive in response to said received geometric primitive and said left view transformation matrices, and wherein said transformation unit is further configured to generate a second transformed geometric primitive in response to said received geometric primitive and said right view transformation matrices, wherein said rendering unit operates to render said first transformed geometric primitive and said second transformed geometric primitive on the display screen.

21. The computer system of claim 20, wherein said first transformed geometric primitive is a first element of a stereo pair, and wherein said second transformed geometric primitive is a second element of the stereo pair;

wherein the rendering unit operates to render said stereo pair on the display screen, wherein said rendered stereo pair effectuates a stereo mode to a viewer.

22. The computer system of claim 21, wherein said received geometric primitive comprises a portion of an object, and wherein said object comprises a plurality of geometric primitives, and wherein said computer system is further configured to render stereo pairs corresponding to each of said plurality of geometric primitives, thereby rendering said object in said stereo mode.

23. The computer system of claim 20, wherein the transformation unit executes a microcode routine which performs transformation of said received geometric primitive according to said left view transformation matrices in response to an indication that a first half of a given stereo pair is being processed;

wherein the transformation unit executes said microcode routine which performs transformation of said received geometric primitive according to said right view transformation matrices in response to an indication that a second half of said given stereo pair is being processed.

24. The computer system of claim 20, wherein the memory further stores additional sets of left view transformation matrices and right view transformation matrices, and wherein the transformation unit is configured to perform additional operations according to said additional sets of left view transformation matrices and right view transformation matrices, wherein the graphics device is configured to generate an additional stereo pair for each of said additional sets of left view transformation matrices and right view transformation matrices, wherein said graphics device is configured to render each said additional stereo pair on said display screen, thereby effectuating multi-channel stereo viewing.

25. A graphics subsystem configured to render a received three-dimensional geometric primitive in a stereo format, comprising:

a buffer for storing a received three-dimensional geometric primitive to be rendered in the stereo format;

a rendering unit coupled to the buffer which is operable to access the received geometric primitive from said buffer; wherein the rendering unit is configured to render the received geometric primitive according to a first view and render the received geometric primitive according to a second view; wherein the rendering unit operates to render the received geometric primitive in the stereo format.

26. The graphics subsystem of claim 25, wherein data corresponding to said received geometric primitive is received by the graphics subsystem in a non-stereo format.

27. The graphics subsystem of claim 26, wherein the graphics subsystem receives the data corresponding to said received geometric primitive only once.

28. The graphics subsystem of claim 26, wherein said geometric primitive comprises a portion of an object, wherein said object comprises a plurality of geometric primitives;

wherein the buffer is operable to receive and store said plurality of geometric primitives;

wherein said rendering unit is operable to access each of said plurality of geometric primitives from said buffer; wherein the rendering unit is configured to render each of said plurality of geometric primitives according to said first view and render each of said plurality of geometric primitives according to said second view to render said object in stereo format to a viewer.

29. The graphics subsystem of claim 26, wherein the graphics subsystem further includes:

memory for storing left view transformation matrices and right view transformation matrices; and a transformation unit coupled to the memory and to the buffer which is configured to generate a first transformed geometric primitive in response to said received geometric primitive and said left view transformation matrices, and wherein said transformation unit is further configured to generate a second transformed geometric primitive in response to said received geometric primitive and said right view transformation matrices;

wherein said rendering unit operates to render said first transformed geometric primitive and said second transformed geometric primitive on a display screen.

30. The graphics subsystem of claim 29, wherein said first transformed geometric primitive is a first element of a stereo pair, and wherein said second transformed geometric primitive is a second element of the stereo pair;

wherein the rendering unit operates to render said stereo pair on a display screen, wherein said rendered stereo pair effectuates a stereo mode to a viewer.

* * * * *